(12) United States Patent
Shimata et al.

(10) Patent No.: US 11,504,931 B2
(45) Date of Patent: Nov. 22, 2022

(54) POWDER SUPPLIER

(71) Applicant: Panasonic Intellectual Property Management Co., Ltd., Osaka (JP)

(72) Inventors: Yoshiki Shimata, Osaka (JP); Yoshinori Shishida, Osaka (JP); Daisuke Suetsugu, Osaka (JP); Kazuto Fukuda, Osaka (JP); Toshiya Hiramatsu, Osaka (JP); Motoi Hatanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 397 days.

(21) Appl. No.: 16/831,490

(22) Filed: Mar. 26, 2020

(65) Prior Publication Data
US 2020/0361168 A1 Nov. 19, 2020

(30) Foreign Application Priority Data

May 16, 2019 (JP) .............................. JP2019-093055

(51) Int. Cl.
| | | |
|---|---|---|
| B65G 33/18 | (2006.01) | |
| B65G 33/14 | (2006.01) | |
| B30B 11/24 | (2006.01) | |
| B30B 15/30 | (2006.01) | |

(52) U.S. Cl.
CPC .......... *B30B 11/243* (2013.01); *B30B 11/241* (2013.01); *B30B 15/302* (2013.01); *B65G 33/18* (2013.01)

(58) Field of Classification Search
None
See application file for complete search history.

(56) References Cited

U.S. PATENT DOCUMENTS

| | | | | |
|---|---|---|---|---|
| 5,704,555 A | * | 1/1998 | Arastoopour | ........... B29B 13/10 241/23 |
| 5,743,471 A | * | 4/1998 | Ivanov | .................... B29B 13/10 366/85 |

(Continued)

FOREIGN PATENT DOCUMENTS

| | | |
|---|---|---|
| JP | 11-170097 | 6/1999 |
| JP | 2002-255331 | 9/2002 |

(Continued)

*Primary Examiner* — Kavel Singh
(74) *Attorney, Agent, or Firm* — Wenderoth, Lind & Ponack, L.L.P.

(57) ABSTRACT

A powder supplier, which supplies a powder material to a pressure molding mechanism that continuously generates a molded body, including: a casing having an inlet to which the powder material is supplied and an outlet from which the powder material is discharged; one or a plurality of screws being disposed inside the casing and rotationally driven to transport the powder material in an axial direction; motors being disposed outside the casing and rotationally driving screws; and a regulator being disposed between the screws, and the outlet inside the casing, and regulating a flow of the powder material. The regulator has a rotation shaft perpendicular to the axial direction of the screws, and a width direction of the powder material discharged from the outlet, and being configured to rotate about the rotation shaft.

5 Claims, 10 Drawing Sheets

(56) References Cited

U.S. PATENT DOCUMENTS

| | | | | |
|---|---|---|---|---|
| 6,756,427 | B2* | 6/2004 | Maeda | B29B 7/845 |
| | | | | 523/218 |
| 9,333,674 | B2* | 5/2016 | Asagiri | B29B 7/728 |
| 11,318,646 | B2* | 5/2022 | Yusa | B29C 48/29 |
| 2013/0251927 | A1* | 9/2013 | Kouno | B29B 7/429 |
| | | | | 525/190 |
| 2015/0108696 | A1* | 4/2015 | Kouno | B29C 48/793 |
| | | | | 264/211.21 |

FOREIGN PATENT DOCUMENTS

| JP | 2004-075250 | 3/2004 |
|---|---|---|
| JP | 2006-256854 | 9/2006 |
| JP | 2013-063849 | 4/2013 |
| JP | 2013-063850 | 4/2013 |

* cited by examiner

FIG. 15

| | | EXAMPLE 1 | EXAMPLE 2 | EXAMPLE 3 | COMPARATIVE EXAMPLE 1 | COMPARATIVE EXAMPLE 2 | COMPARATIVE EXAMPLE 3 |
|---|---|---|---|---|---|---|---|
| REGULATOR | | YES | YES | YES | NO | NO | NO |
| NUMBER OF ROTATIONS OF SCREW | FIRST SCREW | 8rpm | 7rpm | 8rpm | 8rpm | 7rpm | 8rpm |
| | SECOND SCREW | 8rpm | 8rpm | 7rpm | 8rpm | 8rpm | 7rpm |
| RANGE OF SUPPLY AMOUNT RATIO (wt%) | | 7.2 | 10.9 | 11.5 | 22.1 | 22.1 | 22.9 |

POWDER SUPPLIER

TECHNICAL FIELD

The technical field relates to a powder supplier.

BACKGROUND

Bonding can be formed between powders to obtain a sintered body by sintering a powder molded body obtained by pressure-molding a powder material such as ceramics or metal at a temperature lower than or equal to a melting point of the powder. There are various methods for producing a powder molded body. For example, as illustrated in Japanese Patent Unexamined Publication No. 2013-63849, a dispersion blade that rotates together with a feeder screw is disposed at a screw feeder outlet, and a material staying at the outlet is discharged so as to be scraped off by the dispersion blade.

In Japanese Patent Unexamined Publication No. 2013-63849, there is still room for improvement in the uniformity of a supply amount of the powder material in a width direction of a powder supplier.

SUMMARY

According to an exemplary embodiment of the present disclosure, there is provided a powder supplier supplying a powder material to a pressure molding mechanism that continuously generates a molded body, the power supplier including: a casing having an inlet to which the powder material is supplied and an outlet from which the powder material is discharged; one or a plurality of screws being disposed inside the casing and rotationally driven to transport the powder material in an axial direction; a motor being disposed outside the casing and rotationally driving the one or the plurality of screws; and a regulator being disposed between the one or the plurality of screws and the outlet inside the casing, and regulating a flow of the powder material. The regulator has a rotation shaft perpendicular to an axial direction of the one or the plurality of screws and a width direction of the powder material discharged from the outlet, and being configured to rotate about the rotation shaft.

According to the present disclosure, it is possible to provide a powder supplier in which uniformity of a supply amount of the powder material in the width direction of the powder supplier is improved.

BRIEF DESCRIPTION OF THE DRAWINGS

FIG. 15 is a table summarizing ranges of the supply amount ratios of the powder materials of Examples 1 to 3 and Comparative Examples 1 to 3.

DESCRIPTION OF EMBODIMENTS

Background to the Present Disclosure

Figure 1:
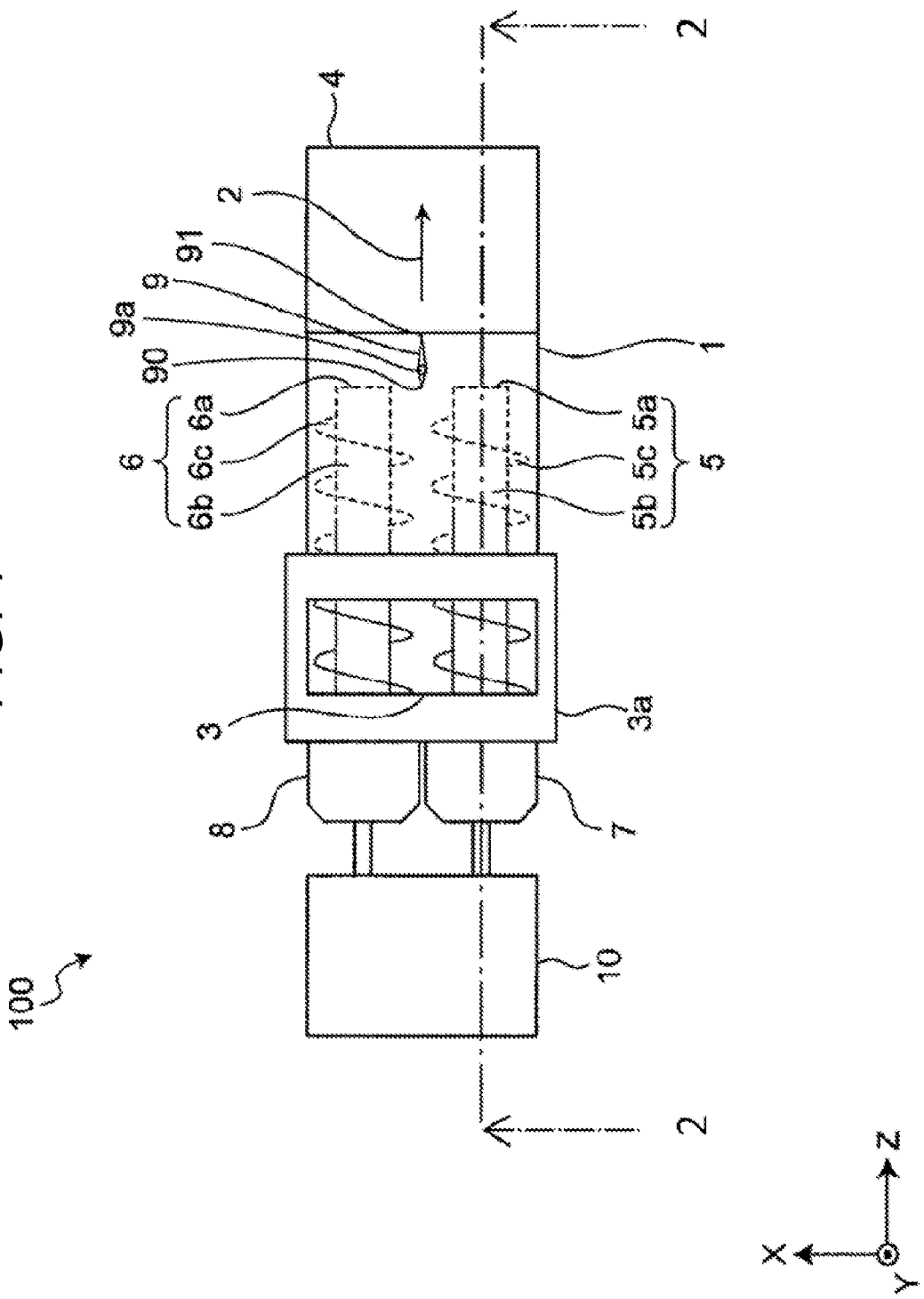
FIG. 1 is a schematic view of a powder supplier of the present disclosure as viewed from above.

A powder molded body obtained by pressure-molding ceramics or metal powder material is sintered at a temperature lower than or equal to a melting point of the powder, so that bonding occurs between the powders and a sintered body can be obtained. This is a main method for producing ceramic products, ceramics, powder metallurgy, cermet, or the like.

As the sintering method, there are an atmospheric pressure sintering method, a gas pressure sintering method, a hot press method, a hot isostatic pressure (HIP) method, an energizing pressurization method, a millimeter wave method, and the like, and it is effective to heat the molded body in a pressurized state. However, these sintering methods have a problem in that productivity is low due to a batch process. As a sintering method for improving productivity, a roll type sintering method that can be continuously processed is widely known. In the roll type, it is possible to continuously perform a pressurizing process and a step of picking up a pressurizing object after the pressurizing process by inserting the pressurizing object into a gap between a pair of rolls, and high productivity can be obtained.

There are also several methods for producing a molded body to be sintered. Similar to the sintering method, a continuous process is required instead of the batch process to increase productivity. In the producing method of the molded body by the continuous process, for example, there is a continuous compression molding method, in which the powder material from a hopper is uniformly placed on a belt conveyor, and then the belt conveyor is operated while pressing the powder material with a curved mold.

In order to suppress generation of voids after sintering due to gas contained in the molded body, or to increase a contact area between the powder materials involved in transmission of heat and load during sintering, it is desirable that a density of the molded body is high. However, in the case of this method, there is a problem that the load applied for escape of the powder material is small and the density of the molded body is low.

Also, as a case of the slip casting method, there is also a method in which an appropriate dispersant (for example, ammonium alginate) is added to the powder material to make a slurry, which is poured into a plaster mold, and the water remaining in the slurry is absorbed into the plaster mold to pick up a remained molded body. Although this method does not use a mold or a press, so that an equipment cost can be reduced, there are problems in that the density of the molded body is lowered and purity of the molded body is lowered due to the residual dispersant.

An example of a method for continuously obtaining the molded body having a high density includes a method in which a powder material is pushed into a gap between a pair of rolls and compression molding is continuously performed. As such a method, there is a method in which rolls are horizontally disposed, a hopper is disposed on an upper portion of the rolls, and the powder material is supplied between the rolls using gravity. However, in order to further increase the density of the molded body, if the material is supplied only by gravity, the load may be insufficient. Further, in such a disposition, since the molded body is vertically discharged, a device is required for recovering the molded body. Therefore, it is desirable to have a method in which the rolls are disposed up and down, the material is continuously supplied by a screw feeder between the upper and lower rolls at a high pressure, and the molded body coming out of the rolls is recovered by a conveyor or the like.

The screw feeder used in the applications described above is required to uniformly supply the material to the roll. Therefore, the method illustrated in Japanese Patent Unexamined Publication No. 2013-63849 has been devised.

However, in the method illustrated in Japanese Patent Unexamined Publication No. 2013-63849, when the powder material is supplied, a flow speed of the powder material flowing near a casing wall is lowered compared to that of the flowing powder material flowing through a central portion away from the casing wall due to friction of the screw feeder with the casing wall. In addition, if the dispersion blade is disposed at an outlet of the screw feeder, a pressure loss may occur when the material is supplied between the rolls, which causes a decrease in the density of the molded body. As described above, in the method illustrated in Japanese Patent Unexamined Publication No. 2013-63849, the uniformity of the material supply amount per unit time can be improved, but the uniformity of the material supply amount in the width direction of the powder supplier is not considered. Therefore, non-uniformity of the material supply amount in the width direction is a problem. Due to non-uniformity in the material supply amount in the width direction, in a case in which two screw feeders or more are used, the rotation speed of the screw feeders does not become the same speed, and variations in a discharge amount in the width direction of the powder supplier occur, thereby causing a reduction of the density of the molded body.

Therefore, the present inventors examined a powder supplier for improving the uniformity of the material supply amount of the powder supplier in the width direction without causing a large pressure loss at the time of powder material supply and devised the following configurations.

A powder supplier according to an aspect of the present disclosure is a powder supplier supplying a powder material to a pressure molding mechanism that continuously generates a molded body, the apparatus including: a casing having an inlet to which the powder material is supplied and an outlet from which the powder material is discharged; one or a plurality of screws being disposed inside the casing and rotationally driven to transport the powder material in an axial direction; a motor being disposed outside the casing and rotationally driving the one or the plurality of screws; and a regulator being disposed between the one or the plurality of screws and the outlet inside the casing, and regulating a flow of the powder material. The regulator has a rotation shaft perpendicular to the axial direction of the one or the plurality of screws and a width direction of the powder material discharged from the outlet, and being configured to rotate about the rotation shaft.

With such a configuration, it is possible to improve a uniformity of a supply amount distribution of the powder material in the width direction of the powder supplier.

In the regulator, a length from the rotation shaft to one tip may be shorter than a length from the rotation shaft to the other tip.

With such a configuration, the rotation of the regulator makes it possible to uniformize sparse and dense of the powder material in the width direction inside the casing, and thereby it is possible to improve the uniformity in the width direction of the powder material discharged from the outlet. A rotational moment can be balanced.

The plurality of screws may include a first screw and a second screw, and the first screw and the second screw may be disposed in parallel in the axial direction and may be rotationally driven in a same direction. The rotation shaft of the regulator may be disposed between extension lines of the shafts of the first screw and the second screw.

With such a configuration, in a case in which the powder material in the width direction is sparse and dense, the powder material can be made uniform by the regulator, and it is possible to improve uniformity of a supply amount of the powder material in the width direction of the powder supplier.

The powder supplier may further include a controller controlling the motor. The controller may control the motor to rotationally drive the first screw and the second screw at the same rotation speed.

With such a configuration, it is possible to further improve the uniformity of the powder material in the width direction inside the casing.

Hereinafter, embodiments will be described with reference to the drawings.

Example 1

Overall Structure

Figure 2:
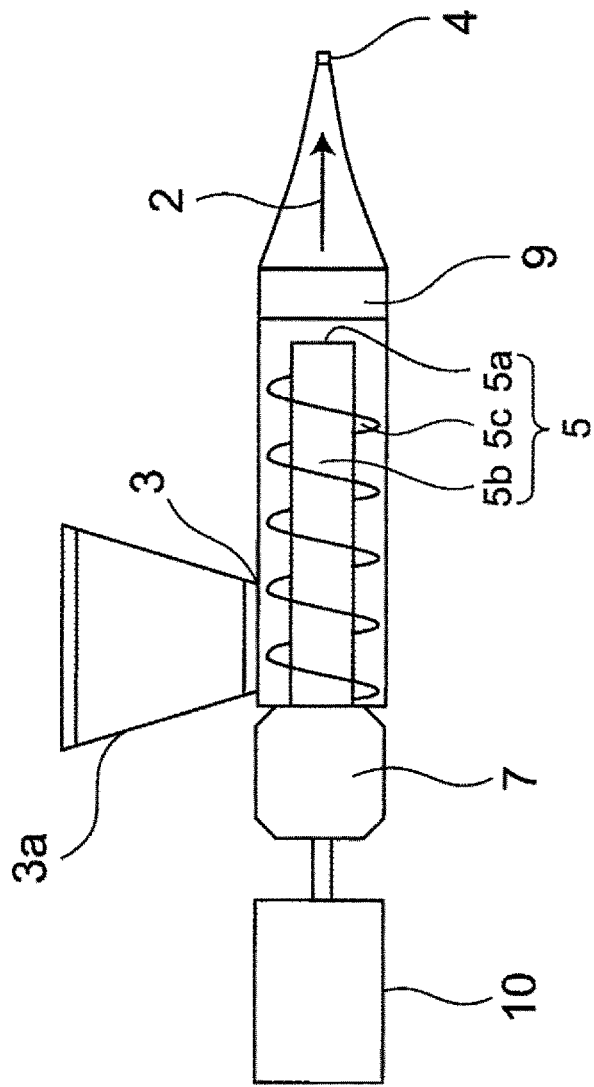
FIG. 2 is a sectional view taken along line 2-2 of the powder supplier of FIG. 1.

FIG. 1 is a schematic view of the powder supplier of the present disclosure as viewed from above. FIG. 2 is a sectional view taken along line 2-2 of the powder supplier of FIG. 1. In the following description, an X direction in each drawing may be referred to as a width direction, a Y direction as a vertical direction, and a Z direction as a material supply direction.

As illustrated in FIGS. 1 and 2, powder supplier 100 supplies powder material 2 indicated by arrow 2 to a pressure molding mechanism (not illustrated) that continuously generates the molded body. Powder supplier 100 includes casing 1 having inlet 3 and outlet 4 for powder material 2, first screw 5, second screw 6, motors 7 and 8, and regulator 9. First screw 5 and second screw 6 are disposed inside casing 1 and are rotationally driven to transport powder material 2 in the axial direction. That is, powder material 2 is transported in the Z direction by first screw 5 and second screw 6. In the present embodiment, although two screws 5 and 6 are disposed, the number of screws is not restricted to this. Motors 7 and 8 are disposed outside casing 1 and rotationally drive first screw 5 and second screw 6. Regulator 9 is disposed between outlet 4, and tips 5a and 6a of first screw 5 and second screw 6 in an outlet 4 side inside casing 1. Powder supplier 100 is disposed adjacent to the pressure molding mechanism. The pressure molding mechanism has two rolls disposed side by side in the vertical direction, and powder material 2 is supplied from outlet 4 of powder supplier 100 between the two rolls. Powder material 2 is discharged in a sheet form from outlet 4, and the molded body is formed by the pressure molding mechanism. Thus, powder material 2 supplied from powder supplier 100 is formed into the molded body by the pressure molding mechanism.

Inlet

As illustrated in FIG. 2, inlet 3 is provided above casing 1 and introduces powder material 2 into casing 1. Inlet 3 is provided with hopper 3a, and powder material 2 is input from an opening of hopper 3a.

Outlet

Outlet 4 is provided at an end of casing 1 on a pressure molding mechanism side. Powder material 2 is discharged from outlet 4 in the horizontal direction between upper and lower rolls of the pressure molding mechanism. As illustrated in FIG. 2, casing 1 is formed so as to be thinner toward outlet 4.

Screw

As illustrated in FIG. 1, first screw 5 and second screw 6 are disposed inside casing 1 in parallel in the width direction, and transport powder material 2 in the material supply direction. Each of the rotation shafts of first screw 5 and second screw 6 is parallel to the material supply direction. That is, first screw 5 and second screw 6 are disposed in parallel in the axial direction. First screw 5 and second screw 6 respectively have screw shafts 5b and 6b, and flights 5c and 6c formed on outer peripheral surfaces of screw shafts 5b and 6b. First screw 5 is rotationally driven by motor 7, and second screw 6 is rotationally driven by motor 8. First screw 5 and second screw 6 are rotationally driven in the same direction. The rotation speeds of motors 7 and 8 can be independently controlled by controller 10.

Regulator

As illustrated in FIG. 1, regulator 9 is disposed between first screw 5 and second screw 6, and outlet 4 inside casing 1, and regulates the flow of powder material 2. Specifically, regulator 9 may be disposed between tips 5a and 6a of first screw 5 and second screw 6 on an outlet 4 side, and outlets 4. In the present embodiment, regulator 9 is formed so that a cross-sectional area decreases toward tips 90 and 91. That is, regulator 9 is formed with sharp tips 90 and 91. Tips 90 and 91 of regulator 9 may be roundly formed. Regulator 9 is formed of a plate-like member, and has a rhombus shape when viewed in the vertical direction and a rectangular shape when viewed in the width direction. Regulator 9 is disposed so that one tip 90 of regulator 9 faces first screw 5 and second screw 6 sides and other tip 91 of regulator 9 faces the outlet 4 side. If tips 90 and 91 of regulator 9 are formed in this way, it is possible to prevent the flow of powder material 2 from being delayed by regulator 9.

Figure 7:
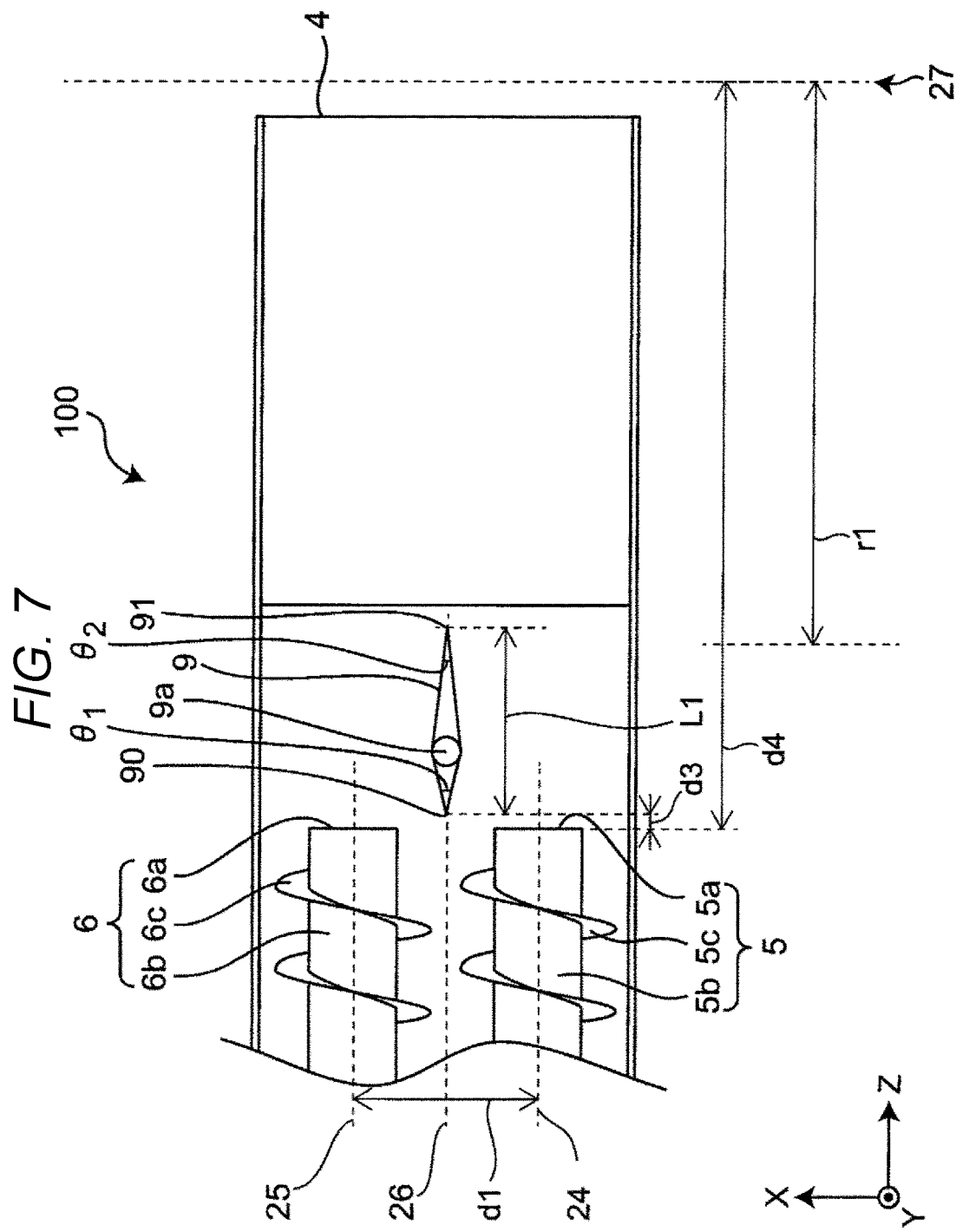
FIG. 7 is a view illustrating a configuration of a powder supplier of Example 1.

Regulator 9 has rotation shaft 9a perpendicular to the axial direction of first screw 5 and second screw 6, and the width direction of powder material 2 discharged from outlet 4. Regulator 9 can be rotated about rotation shaft 9a. Rotation shaft 9a is disposed between the extension lines of the shafts of first screw 5 and second screw 6. In the present embodiment, as illustrated in FIG. 7 to be described later, regulator 9 is disposed so that rotation shaft 9a is located on center line 26 located in a middle between axis line 24 of first screw 5 and axis line 25 of second screw 6. In the present embodiment, a length from rotation shaft 9a to one tip 90 is shorter than a length from rotation shaft 9a to other tip 91.

Controller

Controller 10 independently controls the rotation speeds of motors 7 and 8. In the present embodiment, motors 7 and 8 are controlled so that first screw 5 and second screw 6 are rotationally driven at the same rotation speed.

Figure 3:
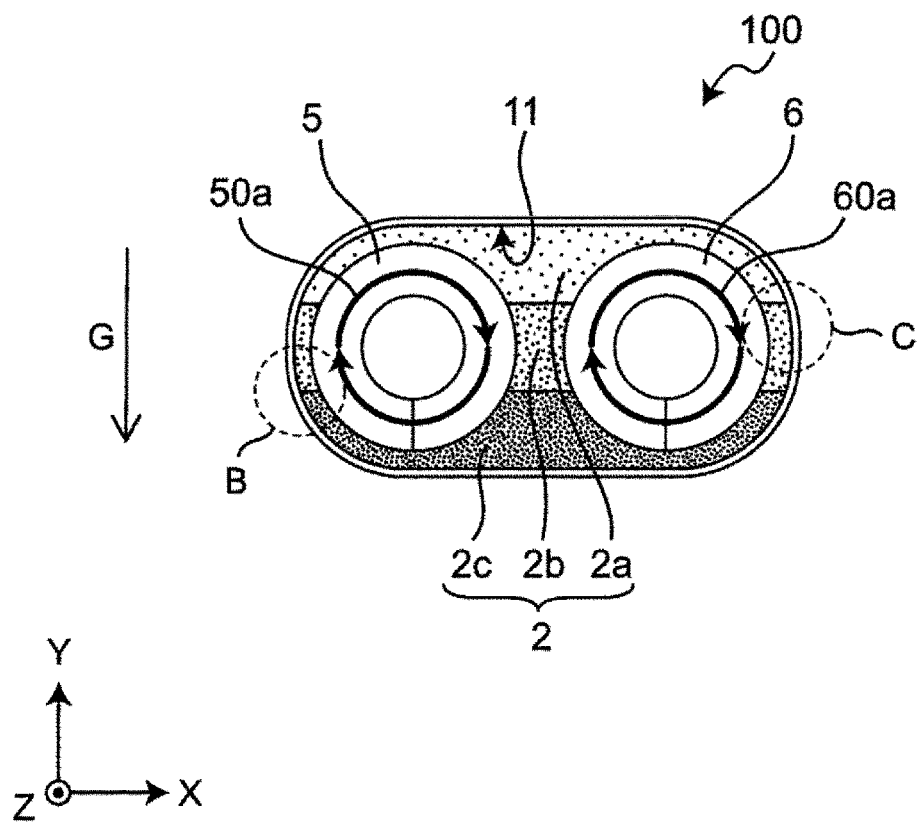
FIG. 3 is a view of an inside of a casing as viewed from an outlet side, in a case in which two screws rotate in a same direction.

With reference to FIG. 3, the distribution of the density of the powder material inside the casing will be described. FIG. 3 is a view of an inside of the casing as viewed from the outlet side, in a case in which two screws rotate in the same direction.

Since powder material 2 flowing in the vicinity of inner wall 11 of casing 1 receives friction with inner wall 11, the flow speed is lower than that at a position away from inner wall 11. Since powder material 2 is affected by gravity G, a density of an upper layer inside casing 1 tends to be lower than that of a lower layer. That is, in FIG. 3, the density of powder material 2b in a middle layer is smaller than the density of powder material 2c of the lower layer, and the density of powder material 2a of the upper layer is further reduced.

In FIG. 3, when viewed from the outlet 4 side, first screw 5 and second screw 6 are disposed to rotate in directions indicated by arrows 50a and 60a, respectively. That is, first screw 5 and second screw 6 are disposed to rotate in the same direction. In this case, since region B surrounded by a broken line is in the vicinity of inner wall 11, the flow speed of powder material 2 is reduced by friction, and powder material 2c in the low layer is pushed upward by first screw 5. Therefore, the density of powder material 2 is high. On the other hand, since region C surrounded by a broken line is in the vicinity of inner wall 11, the flow speed of powder material 2 is reduced by friction, and powder material 2a in the upper layer is pushed downward by second screw 6. Therefore, the density of powder material 2 is small. Therefore, the supply amount of powder material 2 is smaller in region B than that in region C. As described above, in a case in which first screw 5 and second screw 6 rotate in the same direction, the density of powder material 2 does not become uniform inside casing 1. Therefore, the supply amount of the powder material in the width direction varies.

Figure 4:
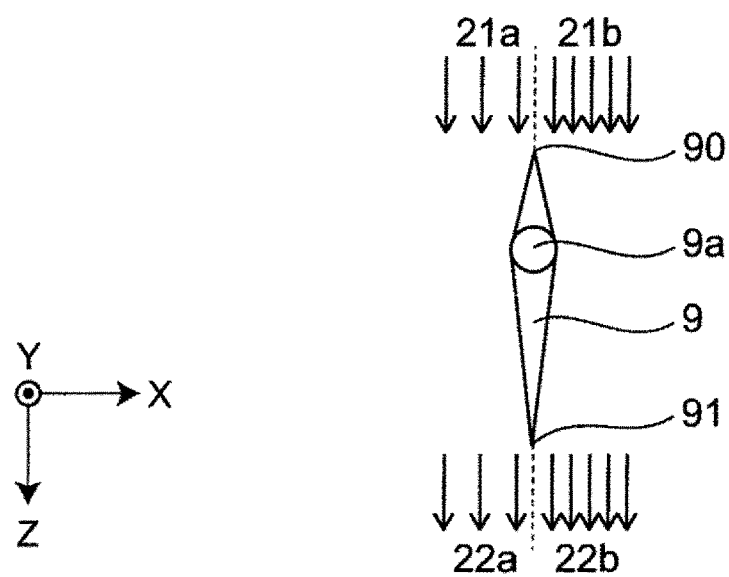
FIG. 4 is a view illustrating a density of a powder material in a vicinity of a regulator inside the casing.
Figure 5:
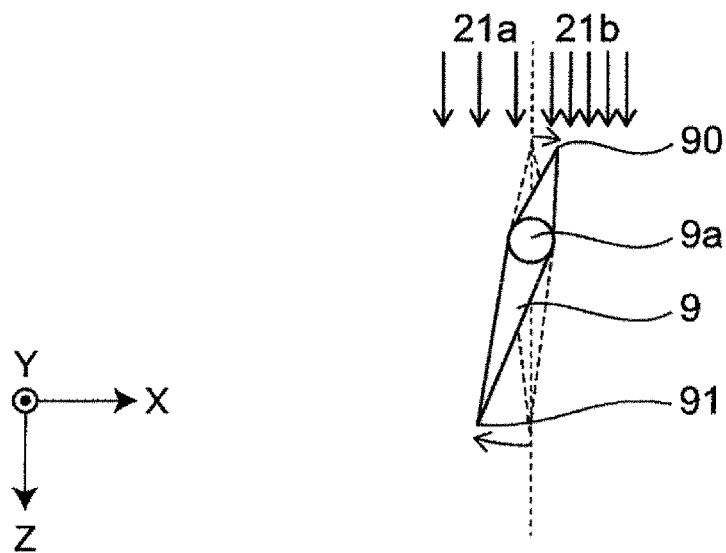
FIG. 5 is a view illustrating the density of the powder material in the vicinity of the regulator inside the casing.
Figure 6:
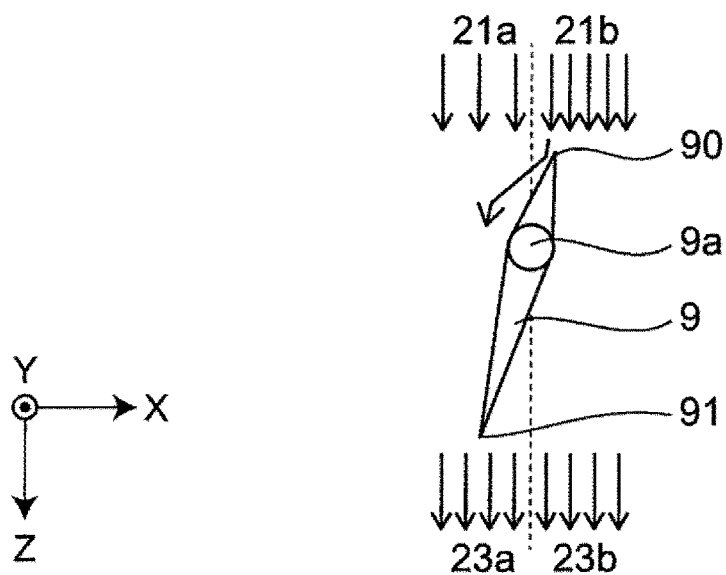
FIG. 6 is a view illustrating the density of the powder material in the vicinity of the regulator inside the casing.

Here, with reference to FIG. 4 to FIG. 6, description that the density of the powder material is uniformed by the rotatable regulator will be given. FIGS. 4 to 6 are views respectively illustrating the density of the powder material in the vicinity of the regulator inside the casing.

As illustrated in FIG. 4, and as described above, the density of powder material 21a on one side from the center is sparse and the density of powder material 21b on the other side from the center is dense, on an upstream of regulator 9, that is, in an upper portion of the drawing. In a case in which regulator 9 does not rotate, the density of powder material 22a on one side from the center is sparse and the density of powder material 22b on the other side from the center is sparse on a downstream of regulator 9, that is, in the lower portion of the drawing. That is, in a case in which regulator 9 does not rotate, sparse and dense of powder material 2 has a same distribution on the upstream and the downstream of regulator 9.

As illustrated in FIG. 5, in a case in which there is a density difference on the upstream of regulator 9, pressures, which act on one side and the other side of regulator 9, that is, in FIG. 5, on a right side and a left side of regulator 9 are different from tip 90 to rotation shaft 9a of regulator 9. In order to maintain a balance of force, a clockwise moment acts on regulator 9, and tip 90 of regulator 9 is inclined toward a powder material 21b side, that is, in a direction in which the density is dense. In this case, other tip 91 is inclined in a direction in which the density is sparse. As illustrated in FIG. 6, since a part of powder material 21b flows to the illustrated left side of regulator 9, variation in the densities of powder material 23a on one side from the center and powder material 23b on the other side from the center on the downstream of regulator 9 can be reduced. In the present embodiment, the densities of powder materials 23a and 23b are substantially equal. Therefore, sparse and dense of the powder material can be made uniform in the width direction by disposing rotatable regulator 9 inside casing 1.

The length of regulator 9 from rotation shaft 9a to one tip 90 is shorter than the length from rotation shaft 9a to other tip 91. That is, a length of a portion close to first screw 5 and second screw 6 from rotation shaft 9a is shorter than a length of a portion close to outlet 4 from rotation shaft 9a. Due to regulator 9 having such a shape, a greater force is applied to the portion of regulator 9 from rotation shaft 9a to one tip 90 than that applied to the portion from rotation shaft 9a to the other tip 91. Therefore, it is possible to balance the rotational moment and to make sparse and dense of the powder material uniform.

Comparison of Supply Amount Distribution of Powder Material According to Disposition of Regulator and Rotation Speed of Screw Here, supply amount distributions of the powder material in the width direction of powder supplier 100 in Examples 1 to 3 and Comparative Examples 1 to 3 to be described later are compared with each other and examined.

In Examples 1 to 3 and Comparative Examples 1 to 3, a powder material containing silicon oxide as a main raw material is used. A configuration of powder supplier 100 and a configuration of the powder material are common in Examples 1 to 3.

Configuration of Powder Supplier 100

Figure 8:
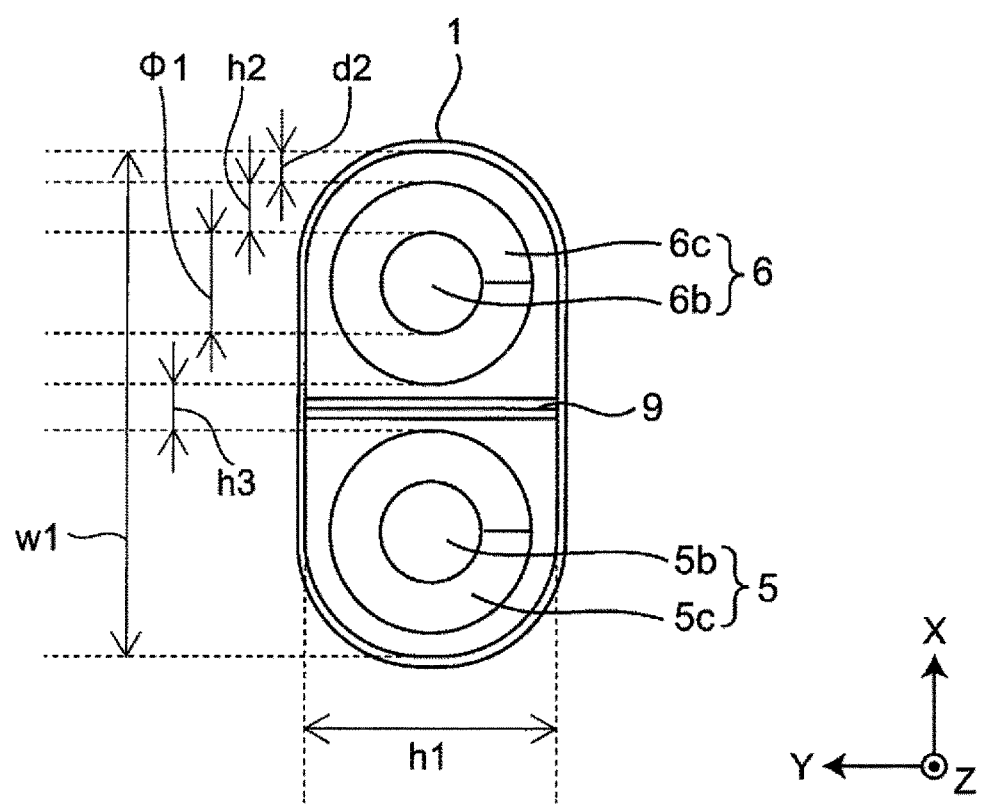
FIG. 8 is a view of an inside of a casing of the powder supplier of FIG. 7 as viewed from an outlet side.

FIG. 7 is a view illustrating a configuration of the powder supplier of Example 1. FIG. 8 is a view of the inside of the casing of the powder supplier of FIG. 7 as viewed from the outlet side. As illustrated in FIG. 8, height h1 in the vertical direction inside casing 1 is 50 mm, and size w1 in the width direction inside casing 1 is 100 mm. As illustrated in FIG. 7, first screw 5 and second screw 6 are disposed in parallel in the width direction inside casing 1. Diameter φ1 of the screw shafts 5b and 6b of first screw 5 and second screw 6 is 20 mm, and height h2 of flights 5c and 6c for transporting the powder material from screw shafts 5b and 6b is 10 mm. As illustrated in FIG. 7, first screw 5 and second screw 6 are disposed such that distance d1 between axis lines 24 and 25 of screw shafts 5b and 6b is 50 mm. As illustrated in FIG. 8, distance d2 from inner wall 11 of casing 1 to flights 5c and 6c is 5 mm, and distance h3 between flights 5c and 6c is 10 mm. Regulator 9 is provided such that rotation shaft 9a is disposed on center line 26 located in the middle of axis lines 24 and 25 of first screw 5 and second screw 6. Distance d3 in the material supply direction from tips 5a and 6a of first screw 5 and second screw 6 on the outlet 4 side to one tip 90 of regulator 9 is disposed to be 5 mm. Regulator 9 has length L1 in the material supply direction of 50 mm, and a height in the vertical direction of 50 mm, which is equal to height h1 inside casing 1. When viewed in the vertical direction, regulator 9 is formed such that angle θ1 of one tip 90 is 30° and angle θ2 of other tip 91 is 20°. Distance d4 from the tips of first screw 5 and second screw 6 to minimum gap line 27 of the two rolls provided in the pressure molding mechanism is 200 mm, radius r1 of the two rolls is 150 mm, respectively, and an interval of a minimum gap of the two rolls is 4 mm.

Composition of Powder Material

As the powder material, a material mainly composed of silicon oxide is used. The powder material is classified into 0.1 mm or more and less than 2.0 mm by using a sieve, and a bulk density is 0.8 g/cc.

In the width direction of powder supplier 100 immediately before being supplied from powder supplier 100 to the pressure molding mechanism, that is, discharged from outlet 4 by powder supplier 100 and the powder material having the configuration described above, the distribution of the supply amount of the powder material was measured. The distribution of the density of the molded body was measured immediately before being supplied from powder supplier 100 to the pressure molding mechanism, that is, after being passed through the pressure molding mechanism in the width direction of powder supplier 100, discharged from outlet 4. In the distribution of the supply amount ratio of the powder material in the width direction of powder supplier 100, the supply amount ratio for every 25 mm in the width direction with respect to a total supply amount was measured. In the distribution of the density of the molded body in the width direction of powder supplier 100, the density of the molded body was measured for every 10 mm in the width direction.

Example 1

In powder supplier 100 illustrated in FIGS. 5 and 6, the rotation speeds of motors 7 and 8 are adjusted so that the amount of the powder material supplied from outlet 4 is 1,800 g/min. That is, the rotation speeds of motors 7 and 8 are set to 8 rpm.

Example 2

The rotation speeds of motors 7 and 8 are adjusted by using the same powder supplier 100 as that in Example 1, so that the feed speed of first screw 5 is reduced by 12.5% with respect to the feed speed of second screw 6. That is, the rotation speed of the motor 7 is set to 7 rpm, and the rotation speed of the motor 8 is set to 8 rpm. Other configurations of powder supplier 100 are the same as those in Example 1.

Example 3

The same powder supplier 100 as that in Example 1 is used, and the rotation speeds of motors 7 and 8 is adjusted so that the feed speed of second screw 6 is reduced by 12.5% with respect to the feed speed of first screw 5. That is, the rotation speed of the motor 7 is set to 8 rpm, and the rotation speed of the motor 8 is set to 7 rpm. Other configurations of powder supplier 100 are the same as those in Example 1.

Comparative Example 1

In contrast to Example 1, regulator 9 is not disposed. Other configurations of powder supplier 100 are the same as those in Example 1.

Comparative Example 2

In contrast to Example 2, regulator 9 is not disposed. Other configurations of powder supplier 100 are the same as those in Example 2.

Comparative Example 3

In contrast to Example 3, regulator 9 is not disposed. Other configurations of powder supplier 100 are the same as those in Example 3.

Comparison Between Examples 1 to 3 and Comparative Examples 1 to 3

Figure 9:
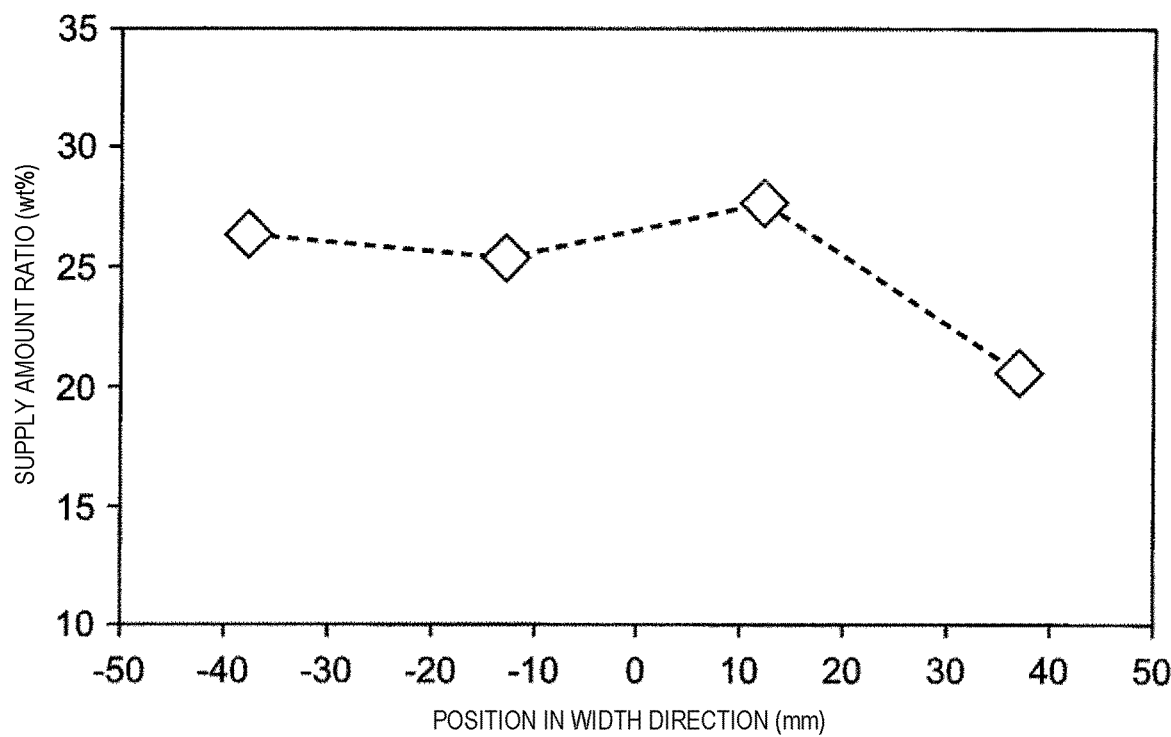
FIG. 9 is a graph illustrating a distribution of a supply amount ratio of the powder material in a width direction of a powder supplier of Example 1.
Figure 10:
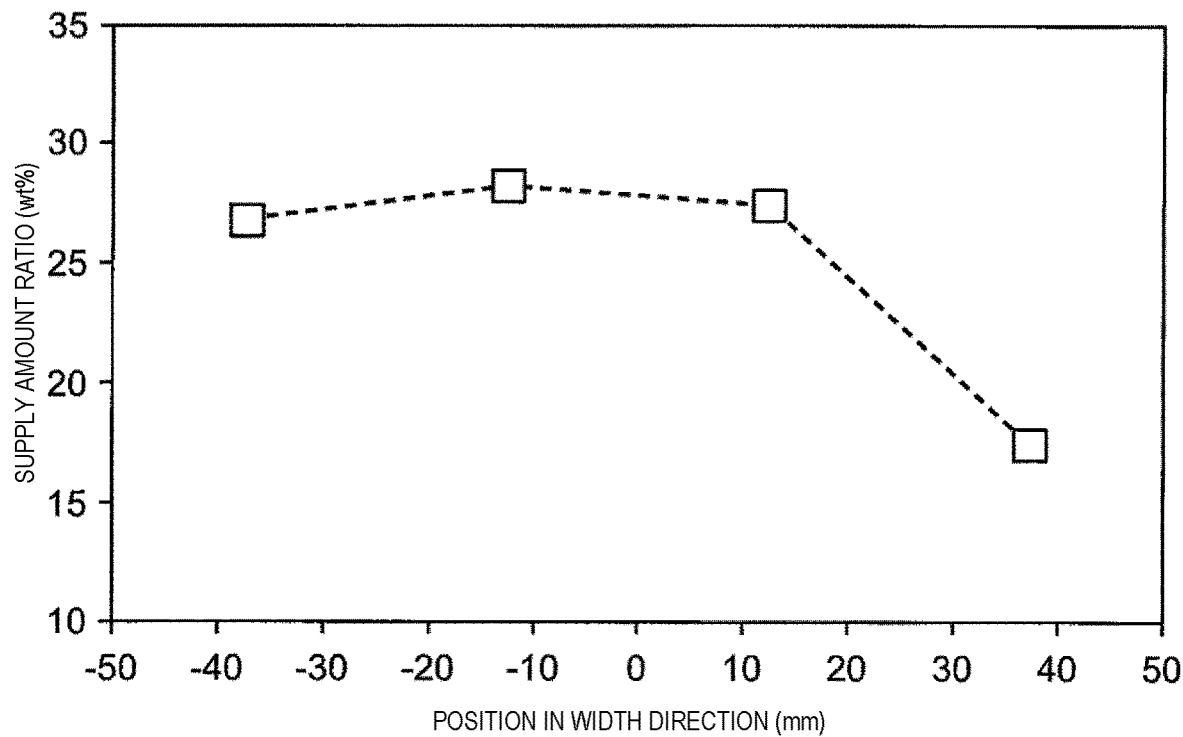
FIG. 10 is a graph illustrating a distribution of a supply amount ratio of the powder material in a width direction of a powder supplier of Example 2.
Figure 11:
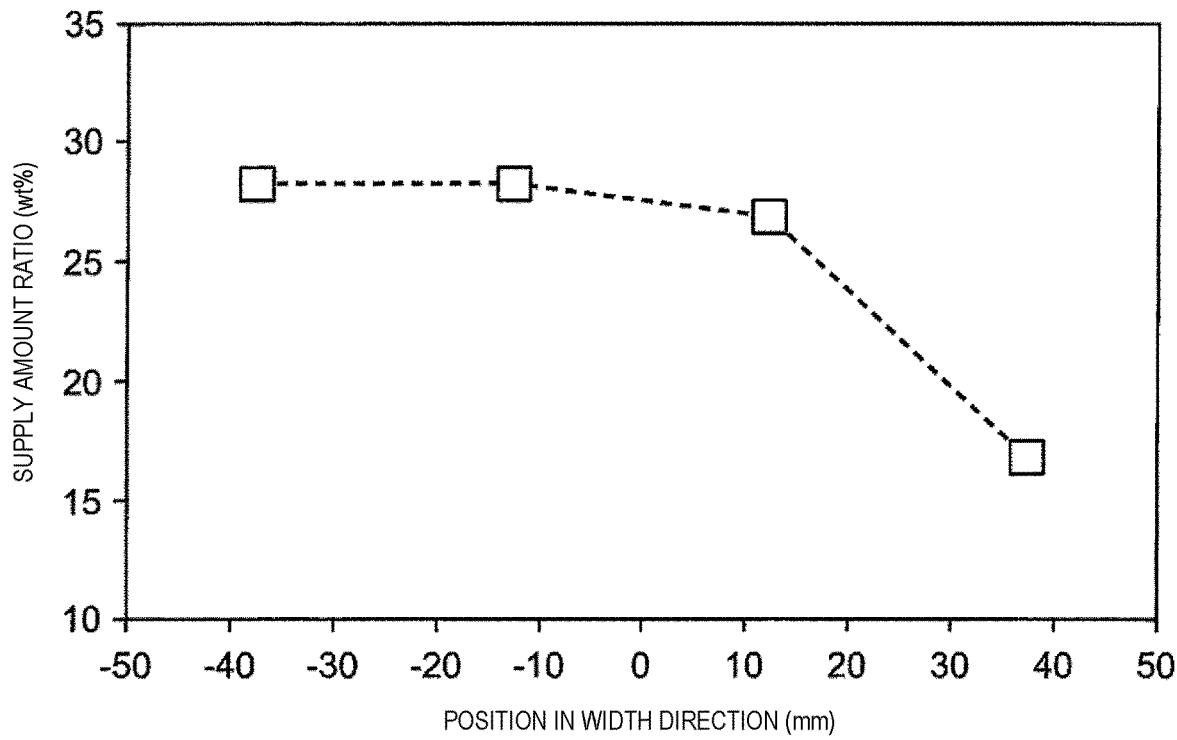
FIG. 11 is a graph illustrating a distribution of a supply amount ratio of the powder material in a width direction of a powder supplier of Example 3.
Figure 12:
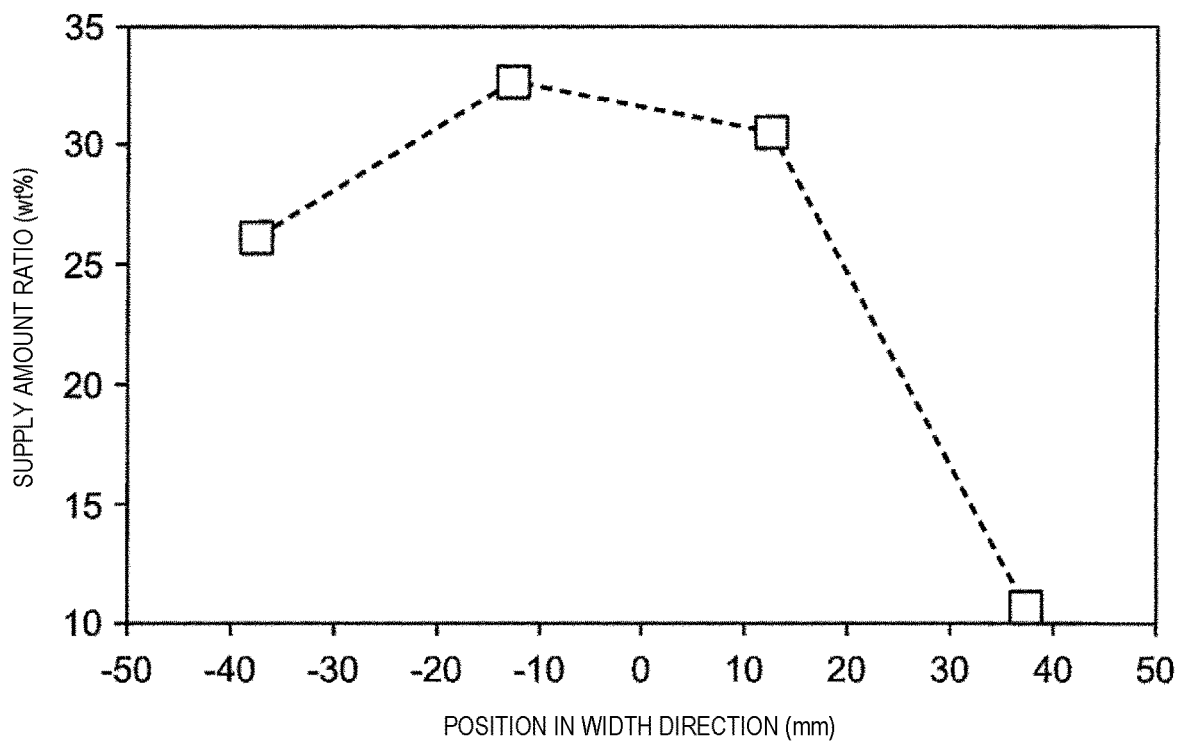
FIG. 12 is a graph illustrating a distribution of a supply amount ratio of the powder material in a width direction of a powder supplier of Comparative Example 1.
Figure 13:
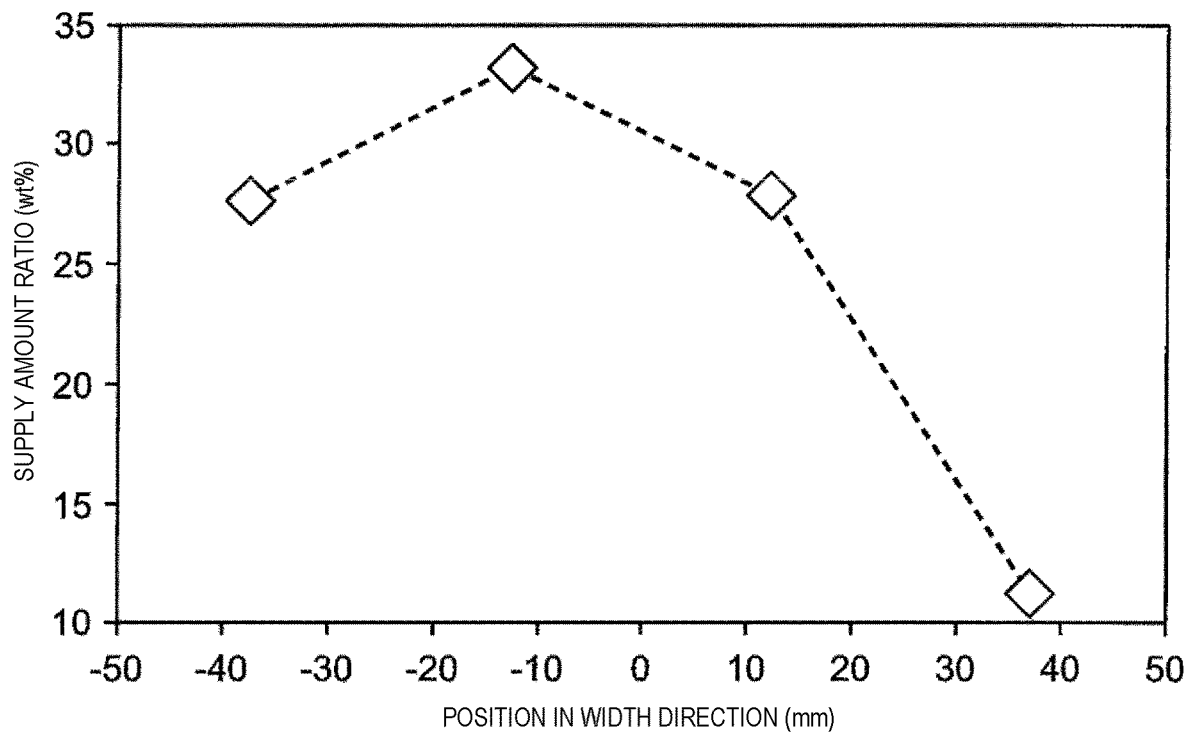
FIG. 13 is a graph illustrating a distribution of a supply amount ratio of the powder material in a width direction of a powder supplier of Comparative Example 2.
Figure 14:
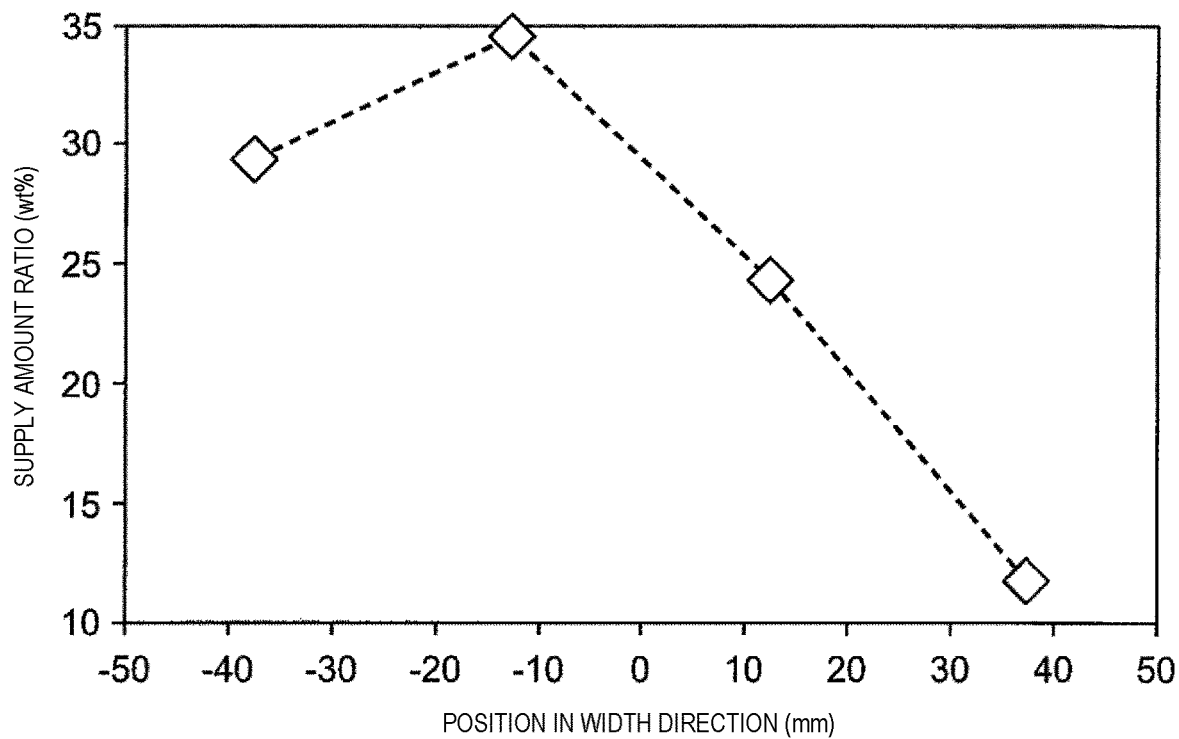
FIG. 14 is a graph illustrating a distribution of a supply amount ratio of the powder material in a width direction of a powder supplier of Comparative Example 3.

With reference to FIGS. 9 to 15, the distribution of the supply amount ratio of the powder material in Examples 1 to 3 and Comparative Examples 1 to 3 will be examined. FIG. 9 is a graph illustrating the distribution of the supply amount ratio of the powder material in the width direction of the powder supplier of Example 1. FIG. 10 is a graph illustrating the distribution of the supply amount ratio of the powder material in the width direction of the powder supplier of Example 2. FIG. 11 is a graph illustrating the distribution of the supply amount ratio of the powder material in the width direction of the powder supplier of Example 3. FIG. 12 is a graph illustrating the distribution of the supply amount ratio of the powder material in the width direction of the powder supplier of Comparative Example 1. FIG. 13 is a graph illustrating the distribution of the supply amount ratio of the powder material in the width direction of the powder supplier of Comparative Example 2. FIG. 14 is a graph illustrating the distribution of the supply amount ratio of the powder material in the width direction of the powder supplier of Comparative Example 3. FIG. 15 is a table summarizing ranges of the supply amount ratio of the powder materials of Examples 1 to 3 and Comparative Examples 1 to 3.

The measuring method of the supply amount ratio of the powder material is as follows. In a state in which powder supplier 100 is separated from the pressure molding mechanism, four containers having an opening width of 25 mm are disposed in parallel in the width direction without gaps at a position where the powder material discharged from outlet 4 can be received. In this state, the powder material is discharged for a certain time. Since all the discharged powder material is recovered in the four containers, the distribution of the supply amount ratio of the powder material is calculated by measuring a total discharged weight of the powder material and a weight of the powder material recovered in each container. In FIGS. 9 to 14, a horizontal axis represents the position in the width direction when centerline 26 is 0, and a value is plotted at the center position in the width direction of each container. A vertical axis represents the supply amount ratio of the powder material in unit wt %.

As illustrated in FIGS. 9 and 12, in Example 1, compared with Comparative Example 1, the supply amount ratio of the powder material is small near the center in the width direction, and is large near both ends in the width direction. This is because the uniformity of the supply amount ratio of the powder material in the width direction is improved by disposing regulator 9. Further, as illustrated in FIG. 15, the range of the supply amount ratio is smaller in Example 1 than that in Comparative Example 1. From the range of the supply amount ratio, it can be seen that the uniformity of the supply amount ratio of the powder material is improved in Example 1 more than that in Comparative Example 1. The range of the supply amount ratio of the powder material is a difference between a maximum value and a minimum value of the measured values in Examples 1 to 3 and Comparative Examples 1 to 3

As illustrated in FIGS. 10 and 13, in Example 2, the supply amount ratio of the powder material near the center in the width direction is smaller than that in Comparative Example 2, and the supply amount ratio of the powder material near both ends in the width direction is larger than that in Comparative Example 2. Similarly, as illustrated in FIGS. 11 and 14, in Example 3, the supply amount ratio of the powder material near the center in the width direction is smaller than that in Comparative Example 3, and the supply amount ratio of the powder material near both ends in the width direction is larger than that in Comparative Example 3. Thus, the uniformity of the supply amount ratio of the powder material in the width direction is improved by disposing regulator 9 compared to a case in which regulator 9 is not disposed.

As illustrated in FIG. 15, the range of the supply amount ratio of the powder material in the width direction is 10.9 wt % in Example 2 and 11.5 wt % in Example 3. When comparing Examples 1 to 3, in Example 1, in which the feed speeds of first screw 5 and second screw 6 are equal to each other, the range of the supply amount ratio is the smallest value. Therefore, it is possible to improve the uniformity of the supply amount of the powder material in the width direction by setting the rotation speed of the motor 7 and the rotation speed of the motor 8 to the same speed.

Effects

According to the embodiments described above, it is possible to improve the uniformity of the supply amount of the powder material in the width direction of powder supplier 100 by providing rotatable regulator 9 between the tip of the screw on the outlet side and the outlet.

The structure and dimensions of the apparatus described in the present embodiments are merely examples, and the present disclosure is not limited to the present embodiments. For example, in the present embodiments, the powder supplier using two screws has been described as an example, but even if the regulator is disposed in the powder supplier using one screw or three screws or more, the same effects can be obtained.

As described above, a molded body having a uniform density distribution in the width direction of powder supplier 100 can be obtained by using the powder supplier of the present disclosure.

INDUSTRIAL APPLICABILITY

The powder supplier according to the present disclosure contributes to high performance of various industrial products that require a sintered body that is heat-treated at a temperature equal to or lower than the melting point of the powder after the powder material is press-molded. In particular, it is effective for improving the performance of insulating components and battery materials.

What is claimed is:

1. A powder supplier supplying a powder material to a pressure molding mechanism that continuously generates a molded body, the powder supplier comprising:
    a casing having an inlet to which the powder material is supplied and an outlet from which the powder material is discharged;
    one or more screws being disposed inside the casing and rotationally driven to transport the powder material in an axial direction of the one or more screws;
    a motor being disposed outside the casing and rotationally driving the one or more screws; and
    a regulator being disposed inside the casing, and disposed between the outlet of the casing and an end of the one or more screws, the regulator being configured to regulate a flow of the powder material,
    wherein the regulator has a rotation shaft which extends in a direction that is perpendicular to the axial direction of the one or more screws and perpendicular to a width direction of the casing, and the regulator is configured to rotate about the rotation shaft.

2. The powder supplier of claim 1,
    wherein the regulator extends in the axial direction from a first tip to a second tip, and a length from the rotation shaft to one of the first and second tips is shorter than a length from the rotation shaft to the other of the first and second tips.

3. The powder supplier of claim 1,
    wherein the one or more screws include a first screw and a second screw,
    wherein the first screw and the second screw are disposed in parallel in the axial direction and are rotationally driven in the same direction, and
    wherein the rotation shaft of the regulator is disposed between extension lines of shafts of the first screw and the second screw.

4. The powder supplier of claim 3, further comprising:
    a controller controlling the motor,
    wherein the controller is configured to control the motor to rotationally drive the first screw and the second screw at a same rotation speed.

5. The powder supplier of claim 1,
    wherein the regulator extends in the axial direction from a first tip to a second tip, and a length from the rotation shaft to one of the first and second tips is shorter than a length from the rotation shaft to the other of the first and second tips, and
    a width of the regulator decreases in the axial direction from the rotation shaft to the one of the first and second tips, and decreases in the axial direction from the rotation shaft to the other of the first and second tips.

* * * * *